United States Patent [19]

Crone, Jr.

[11] 4,419,394
[45] Dec. 6, 1983

[54] CATALYST AND METHOD OF MAKING THE SAME

[75] Inventor: John M. Crone, Jr., Fishkill, N.Y.

[73] Assignee: Texaco Inc., White Plains, N.Y.

[21] Appl. No.: 321,861

[22] Filed: Nov. 16, 1981

[51] Int. Cl.$^3$ .......................... B05D 1/18; B05D 7/24
[52] U.S. Cl. ................................ 427/434.5; 427/435; 428/469; 428/689
[58] Field of Search ............................ 427/435, 434.5; 428/689, 469

[56] References Cited

U.S. PATENT DOCUMENTS 3,227,659  1/1966  Brandenburg et al. ............. 422/177
3,231,520  1/1966  Leak et al. .......................... 422/211

Primary Examiner—Norman Morgenstern
Assistant Examiner—Richard Bueker
Attorney, Agent, or Firm—Carl G. Ries; Robert A. Kulason; Martin M. Glazer

[57] ABSTRACT

A coating solution, useful in the process of coating a substrate with an alumina film, can be formed by adding to an alkali aluminate solution a sufficient quantity of an alumina gel which is a precipitate formed by the reaction of aluminum sulfate with aqueous ammonium hydroxide at a pH of between about 6 and 8. The added alumina gel effects a coating of an adherent alumina trihydrate film on a substrate upon the contacting of the substrate with the coating solution.

6 Claims, No Drawings

CATALYST AND METHOD OF MAKING THE SAME

BACKGROUND OF THE INVENTION

1. Field of the Invention

This invention relates to the preparation of alumina coated structures, and more particularly to a method of preparing alumina coating solutions and regenerating depleted alumina coating solutions.

2. The Prior Art

A catalyst and a catalyst support comprising a substrate having an adherent film of alumina formed thereon is disclosed in coassigned U.S. Pat. No. 3,231,520, incoporated herein by reference. The alumina film is disclosed as being useful as a support for catalytic materials which promote various reactions, such as those useful in treating exhaust gases from internal combustion engines. The alumina film is disclosed as being formed on a substrate, which can be metallic or nonmetallic and which can have a variety of configurations, by first contacting the substrate with a solution of an alkali metal aluminate. The adherent film of hydrated alumina which is formed on the substrate is then dried and calcined, producing a hard tenacious film of alumina on the substrate.

Coassigned U.S. Pat. Nos. 3,227,659 and 3,410,651 disclose the impregnation of the calcined alumina film with phosphorus and chromium containing materials, respectively. Coassigned British Pat. No. 1,271,710 discloses that the alumina coated substrate can be used by itself, without any added materials, as a filter to remove lead or lead compounds. The use of an alumina coated substrate to filter and remove carbon particles from diesel engine exhaust gases is disclosed in coassigned U.S. Pat. No. 4,039,294.

In coassigned U.S. Pat. No. 3,231,520 the preferred sodium aluminate coating solution, used for applying the adherent alumina film, is disclosed as being formed by dissolving metallic aluminum in a relatively strong aqueous solution of sodium hydroxide. Alternatively, when deemed desirable, the coating solution can also be formed by dissolving alumina in a strong aqueous solution of sodium hydroxide, or dissolving commercial sodium aluminate in water. A substrate is then immersed into the coating solution. During a period of time, which varies depending on the temperature of the solution and the concentration of sodium aluminate and sodium hydroxide in the solution, the hydrated alumina film forms on the substrate and grows until it reaches a desired thickness.

In many previously used coating methods, excess aluminum metal was added to the sodium hydroxide solution. As the alumina film formed on the substrate, the concentration of the sodium aluminate in the solution decreased, and aluminum metal dissolved into the sodium hydroxide solution to maintain an almost constant supersaturated solution of sodium aluminate.

French Pat. No. 75.39408 notes certain difficulties encountered in using aluminum metal to form the coating solution. Highly pure aluminum metal, of 99.99 percent purity, is preferred in such processes, since aluminum metal of a lower purity can give a violent reaction when dissolved into the sodium hydroxide solution. This makes the rate of dissolution of the aluminum metal into the sodium hydroxide solution, and the resultant continuous coating of the alumina, difficult to control. The difficulty in controlling the reaction results in difficulty in regulating or controlling the speed of deposition of the alumina layer on the substrate. For these reasons, the use of impure aluminum metal may result in undesirably long coating times. Further, the evolution of hydrogen gas, which accompanies the use of aluminum metal, is a cause of concern in commercial applications of the coating process. The use of high purity aluminum metal is objectionable because of the higher cost of such pure metal.

The French patent discloses a method in which the aqueous solution of alkali aluminate is formed by dissolving aluminum oxide in sodium oxide solution. Deposition of the alumina on a substrate is accomplished by small pH changes in the coating process. However, the process requires a complicated multistep process and results in long coating times, upwards of 40 hours.

SUMMARY OF THE INVENTION

It now has been discovered that a coating solution, useful in a process of coating a substrate with an alumina film, can be formed by adding a sufficient quantity of an alumina gel to an alkali aluminate solution to effect a coating of an adherent alumina trihydrate film on the substrate upon the contacting of the substrate with the coating solution. The alumina trihydrate film can then be dehydrated and used as such, or be impregnated with a catalytic material. The alumina gel comprises a precipitate formed by the reaction of aluminum sulfate ($Al_2(SO_4)_3$) and aqueous ammonium hydroxide ($NH_4OH$) at a pH of between about 6 and 8. The alkali aluminate solution is preferably sufficiently saturated so as not to dissolve substantially all of the added alumina gel.

The added alumina gel should produce a coating solution simply by the addition of the alumina gel to the solution, and should not require any of the previously used methods of forming a coating solution, such as temperature and pH changes. These other methods, though, also can be used in conjunction with the addition of the alumina gel, if so desired.

PREFERRED EMBODIMENT OF THE INVENTION

A preferred embodiment of the present invention comprises a coating solution formed by the step of adding a sufficient quantity of an alumina gel to a sodium aluminate solution to effect a coating of an adherent alumina trihydrate film on a substrate when the substrate is contacted with the coating solution. The alumina gel is a precipitate formed by the reaction of aluminum sulfate and aqueous ammonium hydroxide at a pH of between about 6 and 8.

It is believed that the useful alumina gel forms amorphous alumina particles, possibly colloidal particles, which have a size from about $0.5 \times 10^{-6}$ to $5 \times 10^{-6}$ meter, with their size preferably being from about $1 \times 10^{-6}$ to $2 \times 10^{-6}$ meter. Particles in this size range are believed to be sufficiently large so as not to completely dissolve into the alkali aluminate solution, while at the same time they are believed to be sufficiently small and amorphous, so as not to crystallize within the solution and precipitate out before being able to coat the substrate. The particles of the preferred alumina gel are believed to be of such a size that they can readily contact the surface of the substrate and crystallize onto the substrate, thereby forming a tenacious film on the substrate, instead of precipitating out or dissolving into the solution, as particles having sizes outside of this range are believed to do. The use of this alumina gel eliminates the need to completely dissolve sufficient added alumina to form a saturated solution, and the subsequent need to lower the pH or temperature to effect supersaturation of the solution to form a coating solution capable of coating a substrate with an alumina trihydrate film.

The alumina gel is preferably dispersed throughout the coating solution by constant stirring or some other system of agitation. The agitation supplies alumina gel to the area immediately surrounding the substrate to insure a rapid and even coating of the substrate.

The preparation of a sodium aluminate solution to which the alumina gel can be added to form the coating solution of the present invention is disclosed in many Journal articles, including one by Chanakya Misra entitled "Solubility of Aluminum Trihydroxide (Hydrargillite) in Sodium Hydroxide Solutions," published in the May 9, 1970 issue of Chemistry & Industry on pages 619 through 623. The article presents graphs and data which disclose the mole ratio of aluminum to sodium necessary to produce a saturated sodium aluminate solution at various temperatures and concentrations of sodium hydroxide. From this article one readily can form a solution of sodium aluminate in an aqueous sodium hydroxide solution at any given temperature. Such solutions, which are without some modification incapable of coating a substrate with an alumina film and which will not dissolve all the added alumina gel, can be made into coating solutions by the method of the present invention, which comprises adding a sufficient quantity of the alumina gel to the solution. Similarly, such data can also predict the concentration of aluminum and sodium in a depleted coating solution since such a solution will be saturated or near saturated. The addition of the alumina gel to such depleted solutions will also form the coating solutions of the present invention.

The exact quantity of alumina gel which is added to the newly formed, or depleted alkali aluminate solution to form a useful coating solution, will depend on the sodium hydroxide concentration and the temperature of the solution. However, the more alumina gel that is added, the faster a film will form on the substrate. Preferably, the alumina gel will be added in sufficient quantity to increase the mole ratio of aluminum to sodium in the solution by about 0.05 to about 0.3, and most preferably the increase in mole ratio will range from about 0.1 to about 0.2. For example, if at a given temperature an alkali aluminate solution has a mole ratio of aluminum to sodium of about 0.6, the alumina gel should increase the mole ratio to between about 0.65 and 0.9, and preferably to between about 0.7 and 0.8.

The substrate onto which the alumina film can be coated can be formed of a metal or a nonmetal, and can include such materials as stainless steel, steel, nickel, iron, iron alloys, chrome-nickel alloys, titanium, sintered metal materials, refractory or ceramic materials (for example high melting point glass), metal oxides (for example, magnesia and silica), or refractory metal silicates or carbides.

The substrate is not restricted to any particular configurations and can have many useful configurations, such as bars, balls, chains, mesh, plates, saddles, sheets, tubes, wires, ribbons, chopped wire, wire mesh, expanded sheets or the like. When the substrate is in a filament form and is enclosed in a casing or tube prior to the deposition of the alumina film on the substrate, the adherent film of alumina forms on both the filaments and on the internal surface of the casing or tube, and bonds the filaments to the interior wall of the casing or tube, forming an encased catalyst. This is disclosed in coassigned U.S. Pat. No. 3,362,783.

The alkali portion of the alkali aluminate is preferably sodium; however, the other alkali metals which include potassium, lithium, rubidium, or cesium can also be used. Further, other cations similar in properties to alkali metal cations can also be used to form the aluminate salt, as quaternary bases such as tetramethyl ammonium hydroxide.

The exact mechanism by which the firm, tenacious film of alumina forms on the substrate is not precisely known. However, it is known that the deposited film is chiefly the trihydrate phase of the alumina. This appears to be true whether or not the sodium aluminate solution, which is used to form the film, is produced by dissolving aluminum metal or alumina into a sodium hydroxide solution, or by using the method of the present invention.

During the coating process, the coating solution is preferably at a temperature above normal room temperature. It is desirable to have the coating solution at a temperature of at least 50° C. and preferably from about 80° to 100° C. The temperature of the coating solution determines the phase of the hydrated alumina formed on the substrate. The preferred alpha alumina trihydrate forms at a temperature above about 50° C. Thus deposition is generally preferred to occur at, or more preferably, above this temperature.

Generally, the film of alumina formed should not be substantially less than about $2 \times 10^{-3}$ centimeter and preferably not less than $1 \times 10^{-2}$ centimeter. Deposits of alumina of almost any thickness are possible, but coatings generally thicker than about $4 \times 10^{-1}$ centimeter are generally not useful. Preferred films are from about $1 \times 10^{-2}$ centimeter to $8 \times 10^{-2}$ centimeter.

After the alumina trihydrate film has been deposited to a suitable thickness on the substrate as an adherent film, the alumina film and the substrate are generally subjected to heating, to drive off at least a part of the water of hydration. The dehydration or calcining of the alumina trihydrate film results in an adherent film being produced, which has a porosity and a measurable surface area. The size of the pores depends on the calcining conditions which include temperature, humidity, and the pressure of the atmosphere surrounding the alumina during dehydration. Calcining can be accomplished with a temperature as low as 150° C. and can continue to temperatures beyond 1300° C. The different heating temperatures produce different forms of alumina having different surface areas and pore sizes.

The surface area and pore size desired for the calcined alumina film will depend on the intended use for the alumina film. A high porosity and a low surface area are useful in treating large volumes of gas, while a low porosity produces a high surface area for contacting a maximum amount of gas with the smallest quantity of alumina.

The calcined alumina film can be used as a support for catalytic materials and metals. The catalytic material can be added to the alumina by way of known methods, such as by forming an aqueous or non-aqueous solution of the catalytic material, and adding the solution to the alumina film. The solvent is then driven off, leaving the catalytic material on the surface of the alumina film. Useful catalytic material include elements found in groups IB, IIB, IVB, VB, VA, VIB, VIIB and VIII of the Periodic Table of the Elements. Particularly useful catalytic materials include platinum, palladium, iridium, rhodium, phosphorous, and chromium.

The invention will be better understood from the following examples, which further illustrate the present invention, but are not meant to limit the invention in any way.

EXAMPLE 1

A concentrate containing an aluminum to sodium mole ratio of about 0.6 was prepared by dissolving 215 grams of sodium hydroxide (NaOH) and 251 grams of aluminum trihydrate (Al(OH)$_3$) in water at about 110° C. A weighed portion of this concentrate was diluted with water to form 600 millimeters of an about one molar sodium hydroxide solution. The mole ratio of aluminum to sodium in the diluted solution remained at about 0.6.

In a second beaker 32 grams of hydrated aluminum sulfate (Al$_2$(SO$_4$)$_3$) was dissolved in 200 milliliters of water. 10 percent by volume aqueous ammonium hydroxide (NH$_4$OH) was added to the aluminum sulfate solution until the pH of the solution was within a range of about 6 to 8. An alumina gel precipitate formed in the mixture of ammonium hydroxide and aluminum sulfate. The precipitate was then filtered but not dried.

The alumina gel precipitate was then added, with constant stirring, to the 600 milliliter solution of sodium hydroxide and aluminum trihydrate which was kept at about 82° C. The alumina gel did not completely dissolve into the sodium aluminate solution.

A knitted stainless steel pad weighing about 8.8 grams was then immersed into the mixture of alumina gel and the solution, and after about 45 minutes, a coating of hydrated alumina began to form on the knitted metal mesh. After a total immersion of about one hour, there was about 0.2 gram of adherent alumina trihydrate film coating the knitted wire mesh. After about 3 and ½ hours of immersion there was about 0.8 gram of hydrated alumina coating on the mesh, and after about 4 and ½ hours of immersion the alumina coating weighed about 1.2 grams.

EXAMPLE 2

600 Milliliters of an about 1 molar sodium hydroxide solution, containing sodium aluminate and having a mole ratio of aluminum to sodium of about 0.6, was formed as in Example 1. The solution was maintained at a temperature of about 82° C., however, no alumina gel precipitate was added as in Example 1. A knitted stainless steel pad weighing about 9.3 grams was immersed into the solution. After remaining in the solution for about 5 hours, no coating was visible on the surface of the stainless steel knitted pad.

EXAMPLE 3

600 Milliliters of an about 1 molar sodium hydroxide solution, containing sodium aluminate and having a mole ratio of aluminum to sodium of about 0.6, was formed as in Example 1. An alumina gel was prepared, as in Example 1, by dissolving 32 grams of hydrated aluminum sulfate into 200 milliliters of water and then adding 10 percent by volume of ammonium hydroxide until the solution had a pH of between about 6 and 8. The alumina gel precipitate was filtered and one half of the precipitate was added, with stirring, to the 600 milliliters of sodium aluminate solution. A 10.4 gram stainless steel pad weighing about 10.4 grams was then immersed into the sodium aluminate solution. After maintaining the sodium aluminate solution for about 3 hours at about 82° C., no coat was observed on the stainless steel pad. The remainder of the alumina gel precipitate was then added to the sodium aluminate solution and the solution was maintained at about 82° C. After about 1 hour, about 0.4 gram of adherent alumina trihydrate film had coated the stainless steel pad.

From the above examples it can be seen that when a stainless steel pad is immersed, as in Example 2, in a sodium aluminate solution, a coating does not form on the stainless steel pad. Similarly, as in Example 3, when a quantity of alumina gel, formed by the reaction of aluminum sulfate with ammonium hydroxide, is added to the sodium aluminate solution, which quantity of alumina gel is too small to form an effective coating solution, an alumina coating still does not form on the substrate. However, as shown in Example 1, when sufficient alumina gel, formed by the reaction of aluminum sulfate with ammonium hydroxide, is added to the sodium aluminate solution, a suitable coating does form on the knitted wire mesh.

The above examples are only illustrative and are not meant to limit the invention, which is set forth in the following claims.

What is claimed is:

1. A method of coating an article comprising the steps of forming a coating solution by adding a sufficient quantity of an alumina gel to an alkali aluminate solution to effect a coating of an adherent alumina trihydrate film on a substrate upon the contacting of the substrate with said coating solution, said alumina gel comprising an amorphous precipitate formed by the reaction of aluminum sulfate and aqueous ammonium hydroxide at a pH of between about 6 and 8, said alumina gel not completely dissolving into said solution and not crystallizing out of said solution prior to forming said adherent alumina trihydrate film; and contacting a substrate with said coating solution for a period of time sufficient to form an adherent alumina trihydrate film on said substrate.

2. A method of coating an article comprising the steps of contacting a substrate with an alkali aluminate solution which does not substantially cost said substrate with an alumina trihydrate film; and adding a sufficient quantity of an alumina gel to the alkali aluminate solution to cause an adherent alumina trihydrate film to form on said substrate, said alumina gel comprising an amorphous precipitate formed by the reaction of aluminum sulfate and aqueous ammonium hydroxide at a pH of between about 6 and 8, and said alumina gel not completely dissolving into said solution and not crystallizing out of said solution prior to forming said adherent alumina trihydrate film.

3. The method of claim 2 wherein the step of adding the alumina gel comprises dispersing the alumina gel throughout the coating solution by agitation.

4. The method of claim 2 wherein the addition of the alumina gel to the alkali aluminate solution increases the aluminum to sodium mole ratio of the alkali aluminate solution to between about 0.65 and 0.9.

5. The method of claim 4 wherein the addition of the alumina gel to the alkali aluminate solution increases the aluminum to sodium mole ratio of the solution to between about 0.7 and 0.8.

6. The method of claim 2 wherein the aluminum to sodium mole ratio in the alkali aluminate solution prior to the addition of the alumina gel is not more than about 0.6.

* * * * *